United States Patent
Yuan et al.

(10) Patent No.: US 7,463,695 B2
(45) Date of Patent: *Dec. 9, 2008

(54) SYSTEM FOR FIVE-LEVEL NON-CAUSAL CHANNEL EQUALIZATION

(75) Inventors: Warm Shaw Yuan, San Diego, CA (US); Daniel M. Castagnozzi, Lexington, MA (US); Keith Michael Conroy, Salem, NH (US)

(73) Assignee: Applied Micro Circuits Corporation, San Diego, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 11/487,732

(22) Filed: Jul. 17, 2006

(65) Prior Publication Data

US 2006/0256891 A1    Nov. 16, 2006

Related U.S. Application Data

(60) Division of application No. 10/150,301, filed on May 17, 2002, now Pat. No. 7,139,325, and a continuation-in-part of application No. 10/020,426, filed on Dec. 7, 2001, now Pat. No. 7,024,599.

(51) Int. Cl.
*H04L 25/34* (2006.01)
*H03M 13/00* (2006.01)

(52) U.S. Cl. .................. 375/287; 714/709

(58) Field of Classification Search ................ 375/287, 375/316, 317, 329; 714/708, 709, 754, 776; 341/68
See application file for complete search history.

(56) References Cited

U.S. PATENT DOCUMENTS

| | | | | |
|---|---|---|---|---|
| 3,670,304 A | * | 6/1972 | Andresen et al. | 714/709 |
| 5,896,422 A | * | 4/1999 | Lu | 375/317 |
| 6,493,329 B1 | * | 12/2002 | Leung | 370/335 |

* cited by examiner

*Primary Examiner*—Khai Tran
(74) *Attorney, Agent, or Firm*—Law Office of Gerald Maliszewski; Gerald Maliszewski (57) ABSTRACT

A system and method are provided for five-level non-causal channel equalization in a communications system. The method comprises: receiving a non-return to zero (NRZ) data stream input; establishing a five-level threshold; comparing the first bit estimate to a second bit value received prior to the first bit; comparing the first bit estimate to a third bit value received subsequent to the first bit; and, in response to the comparisons, determining the value of the first bit. Establishing a five-level threshold includes: establishing thresholds to distinguish a first bit value when the second and third bit values are a "1" value, when the second bit value is a "1" and the third bit value is a "0", when the second bit value is a "0" and the third bit value is a "1", when the second and third bit values are a "0" value, and an approximate midway threshold.

16 Claims, 11 Drawing Sheets

SYSTEM FOR FIVE-LEVEL NON-CAUSAL CHANNEL EQUALIZATION

RELATED APPLICATIONS

This application is a Divisional of a application entitled, SYSTEM AND METHOD FOR FIVE-LEVEL NON-CAUSAL CHANNEL EQUALIZATION, invented by Yuan et al., Ser. No. 10/150,301, filed May 17, 2002, now U.S. Pat. No. 7,139,325.

This application is a continuation-in-part of a application entitled, SYSTEM AND METHOD FOR NON-CAUSAL CHANNEL EQUALIZATION, invented by Castagnozzi et al., Ser. No. 10/020,426, filed Dec. 7, 2001, now U.S. Pat. No. 7,024,599.

This application is related to a pending application entitled, SYSTEM AND METHOD FOR NON-CAUSAL CHANNEL EQUALIZATION IN AN ASYMMETRICAL NOISE ENVIRONMENT, invented by Yuan et al., Ser. No. 10/066,966, filed Feb. 4, 2002.

This application is related to a pending application entitled, SYSTEM AND METHOD FOR NON-CAUSAL CHANNEL EQUALIZATION USING ERROR STATISTIC DRIVEN THRESHOLDS, invented by Castagnozzi et al., Ser. No. 10/077,332, filed Feb. 15, 2002.

This application is related to a pending application entitled, SYSTEM AND METHOD FOR ADJUSTING A NON-RETURN TO ZERO DATA STREAM INPUT THRESHOLD, invented by Acikel et al., Ser. No. 10/077,274, filed Feb. 15, 2002.

BACKGROUND OF THE INVENTION

1. Field of the Invention

This invention generally relates to digital communications and, more particularly, to a system and method for minimizing the effects of inter-symbol interference in a non-return to zero (NRZ) data channel using a five threshold process.

2. Description of the Related Art

Figure 1:
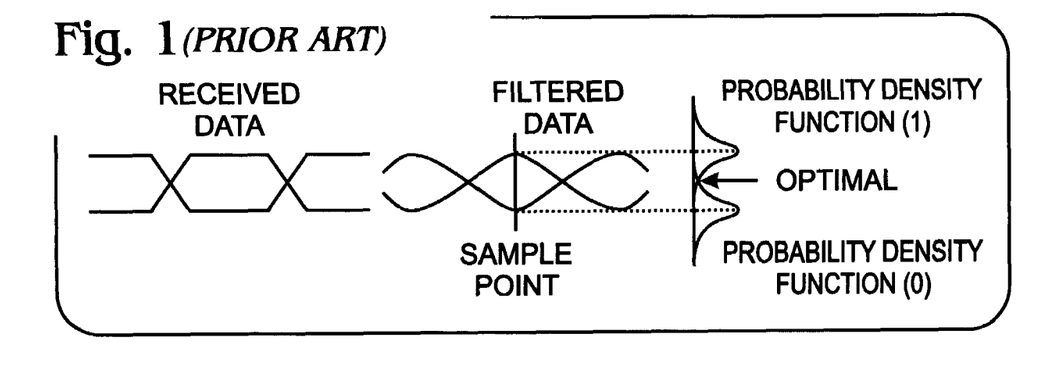
FIG. 1 is a diagram illustrating a signal recovered from a binary symmetric, non-dispersive channel in the presence of noise (prior art).

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if a different thresholds are used for different bit combinations.

Figure 2:
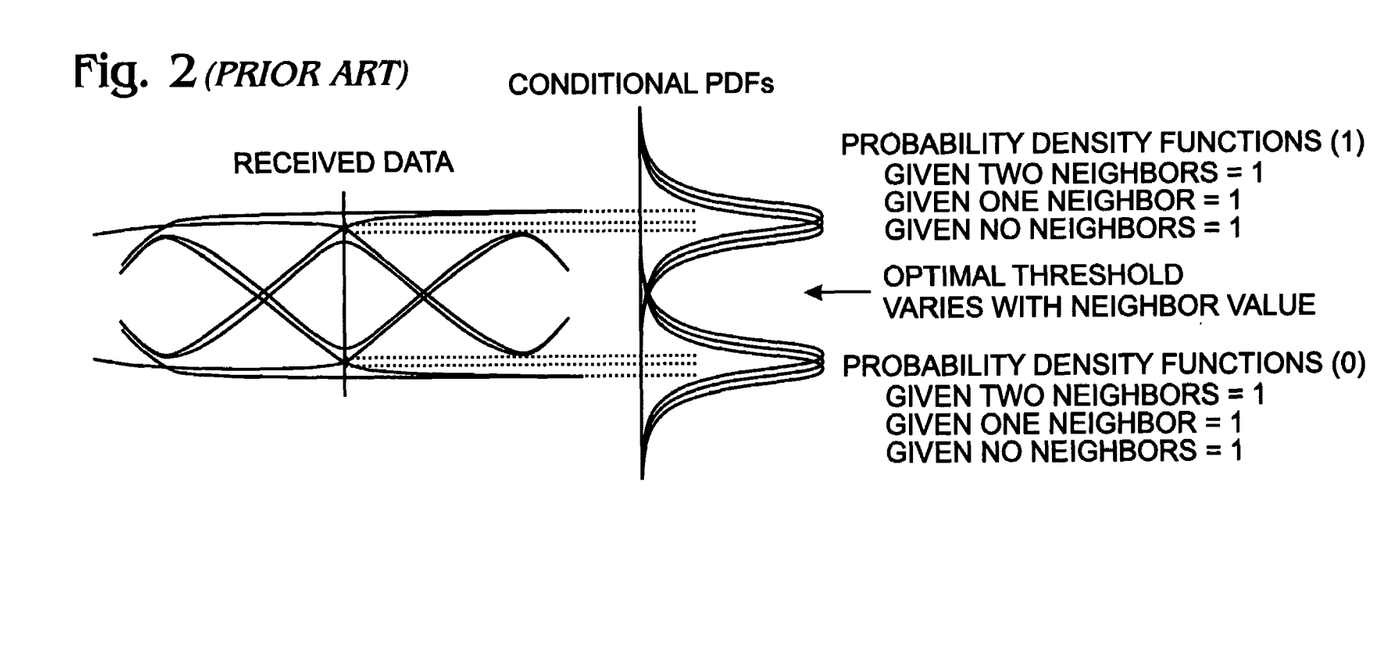
FIG. 2 is a diagram illustrating received waveforms that are distorted in response to the inter-symbol interference resulting from energy dispersion (prior art).

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and scrambling that is often used in the transmission of NRZ data streams. However, received bits can be characterized with probability density functions, as shown. Without knowledge of the neighboring bits, a single probability density function could be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

It would be advantageous if inter-symbol interference caused by energy dispersion in a received NRZ data channel could be minimized.

It would be advantageous if the bit decision thresholds could be modified to take account of the dispersed energy in the neighboring bits in the NRZ data stream.

It would be advantageous if a history of temporal bit patterns could be used to make bit value determinations.

SUMMARY OF THE INVENTION

Many communication channels exhibit temporal spreading of the signaling waveform when propagated over long distances or over non-linear media. This phenomenon is not effectively addressed by conventional linear equalization techniques due to the non-causal nature of the impairment. A method is presented to reduce the effects of pulse spreading on hard-decision error rate in communication systems affected by this problem. The method utilizes multiple decision thresholds for each data bit. Related applications have used a three-level threshold. The present invention uses a five-level threshold for greater granularity in the decision making process. Post-processing of the multiple decision data is employed to reduce the data to a single hard decision per bit. The multiple data thresholds are adjusted for optimal mitigation of the spreading effect.

The proposed approach to this problem is to perform multiple decisions on every bit with a threshold for each of the above-mentioned conditional probability density functions. The multiple decision data is stored for several bit times, to allow a calculation to be made on the succeeding bits. This calculation is then used to select the threshold most appropriate given the estimated neighbor values. The refined decision is output from the device and fed-forward to be used in processing of subsequent bits.

Accordingly, a method is provided for five-level non-causal channel equalization in a communications system. The method comprises: receiving a non-return to zero (NRZ) data stream input; establishing a five-level threshold to distinguish a first bit estimate; comparing the first bit estimate in the data stream to a second bit value received prior to the first bit;

comparing the first bit estimate to a third bit value received subsequent to the first bit; and, in response to the comparisons, determining the value of the first bit.

More specifically, establishing a five-level threshold to distinguish a first bit estimate includes: establishing a first threshold (a11) to distinguish a first bit value when the second and third bit values are a "1" value; establishing a second threshold (a10) to distinguish a first bit estimate when the second bit value is a "1" and the third bit value is a "0"; establishing a third threshold (Vopt) to distinguish first bit estimates having an approximately equal probability of being a "1" value as a "0" value; establishing a fourth threshold (a01) to distinguish a first bit estimate when the second bit value is a "0" and the third bit value is a "1"; and, establishing a fifth threshold (a00) to distinguish a first bit estimate when the second and third bit values are a "0" value. Then, the method supplies the first bit estimate for comparison in response to distinguishing the NRZ data stream input at the first, second, third, fourth, and fifth thresholds.

Some aspects of the method include receiving a non-return to zero data stream encoded with forward error correction (FEC). Then, the method further comprises: following the determination of the first bit values, FEC decoding the first bit values; and, using the FEC corrections of the first bit values to adjust the first, second, third, fourth, and fifth threshold values.

Alternately, the method comprises: maintaining long-term averages of the NRZ data stream inputs; and, adjusting the first, second, third, fourth, and fifth thresholds in response to the long-term averages. In some aspects, the method further comprises: following the determination of the first bit values, FEC decoding the first bit values to determine the total number of "1" bit value errors and "0" bit value errors; using the FEC corrections of the first bit values to make an adjustment to the third threshold (Vopt); and, (optionally) applying the adjustment, made to the third threshold, to the first, second, fourth, and fifth thresholds.

Additional details of the above-described method, and a five-level non-causal channel equalization communication system are provided below.

DETAILED DESCRIPTION OF THE PREFERRED EMBODIMENTS

Figure 3:
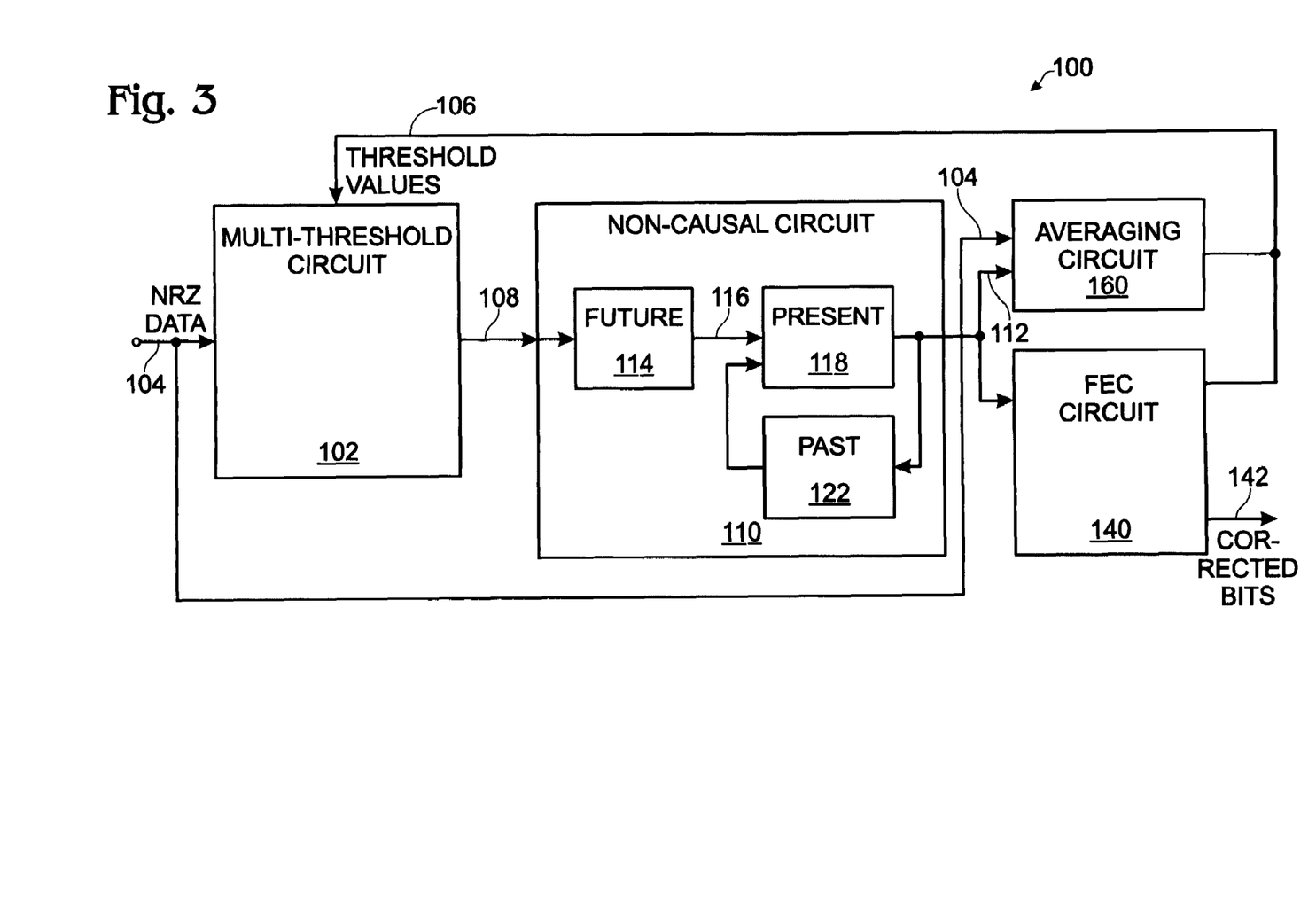
FIG. 3 is a schematic block diagram of the present invention five-level non-causal channel equalization communication system.

FIG. 3 is a schematic block diagram of the present invention five-level non-causal channel equalization communication system. The system 100 comprises a multi-threshold decision circuit 102 having an input on line 104 to accept a non-return to zero (NRZ) data stream, an input on line 106 (106a through 106e) to accept threshold values, and outputs on line 108 (108a through 108e) to provide bit estimates responsive to five voltage threshold levels. A non-causal circuit 110 has inputs on line 108 to accept bit estimates from the multi-threshold decision circuit 102. The non-causal circuit 110 compares a current bit estimate to bit value decisions made across a plurality of clock cycles. The non-causal circuit 110 has an output on line 112 to supply a bit value for the current bit estimate determined in response to the causal bit value comparisons.

The non-causal circuit 110 includes a future decision circuit 114 having inputs on line 108 connected to the mutli-threshold circuit 102 outputs. The future decision circuit 114 has outputs on line 116 (116a through 116e) to supply the current, first bit, estimate and a third (future) bit value.

A present decision circuit 118 has inputs to accept the first bit estimate and the third bit value on line 116, and a second (past) bit value on line 120. The present decision circuit 118 compares the first bit estimate to both the second bit value, received prior to the first bit estimate, and the third bit value, received subsequent to the first bit estimate. The present decision circuit 118 has an output on line 112 to supply the first bit value determined in response to comparing the first bit estimates to the second and third bit values. A past decision circuit 122 has an input on line 112 to accept the first bit value and an output on line 120 to supply the second bit value.

Figure 4:
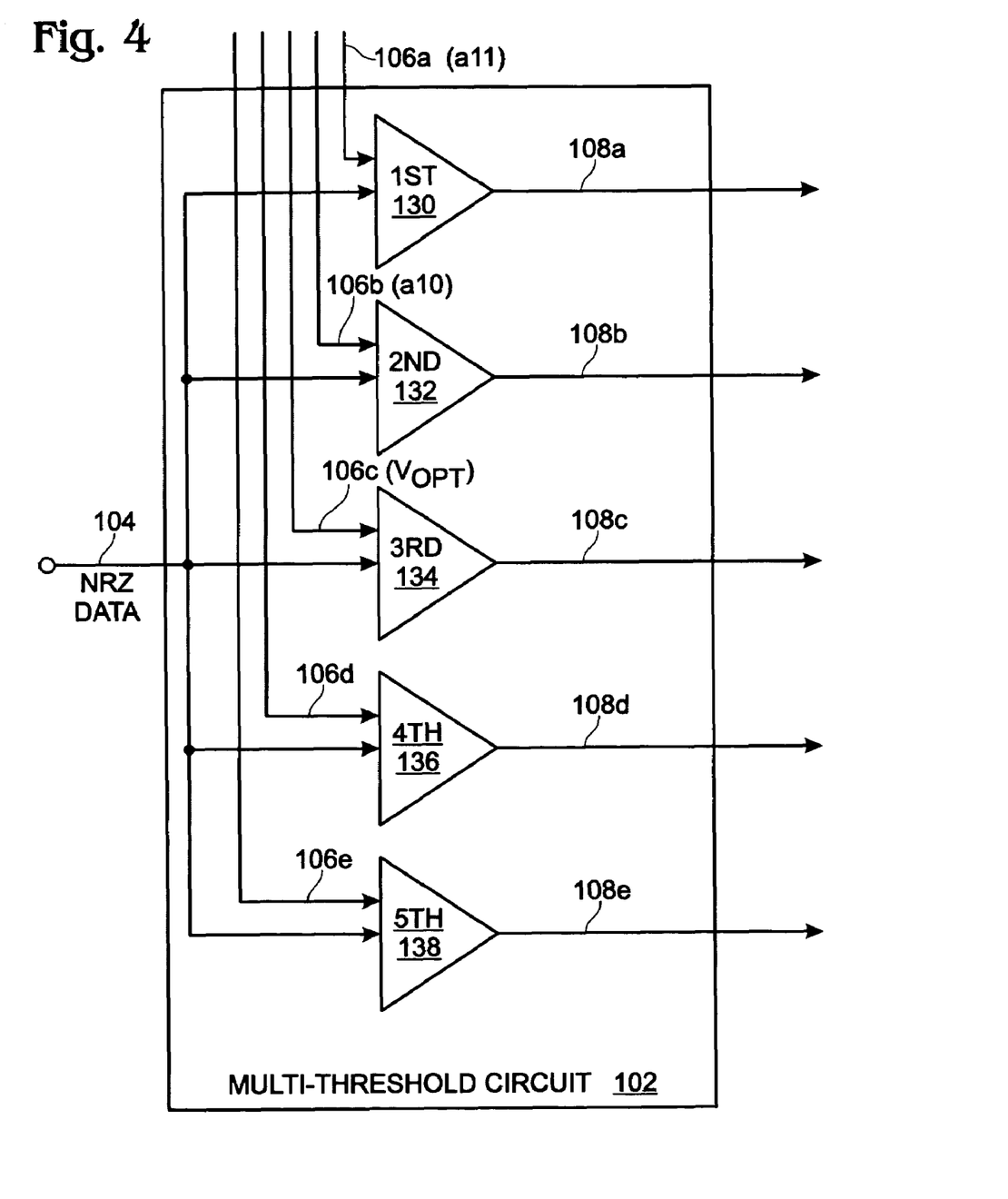
FIG. 4 is a schematic block diagram detailing the multi-threshold circuit of FIG. 3.

FIG. 4 is a schematic block diagram detailing the multi-threshold circuit 102 of FIG. 3. The multi-threshold circuit 102 includes a first comparator 130 having an input on line 104 to accept the NRZ data stream, an input on line 106a establishing a first threshold (a11), and an output on line 108a to supply a first bit estimate when the second and third bit values are equal to "1". As explained below, the output of the first comparator 130 becomes critical in determining the first bit value in circumstances where the preceding (second) and subsequent (third) bit values are both a "1".

A second comparator 132 has an input on line 104 to accept the NRZ data stream, an input on line 106b establishing a second threshold (a10), and an output on line 108b to supply a first bit estimate when the second bit value is a "1" and the third bit value is a "0". The output of the second comparator 132 becomes critical in determining the first bit value in circumstances where the preceding (second) bit value is a "1" and the subsequent (third) bit value is a "0".

A third comparator 134 has an input on line 104 to accept the NRZ data stream, an input on line 106c establishing a third threshold (Vopt), and an output on line 108c to supply a signal having an approximately equal probability of being a "0" value as a "1" value. As explained below, this signal is the third (future) bit value.

A fourth comparator 136 has an input on line 104 to accept the NRZ data stream, an input on line 106d establishing a fourth threshold (a01), and an output on line 108d to supply a first bit estimate when the second bit value is a "0" and the third bit value is a "1". The output of the fourth comparator 136 becomes critical in determining the first bit value in circumstances where the preceding (second) bit value is a "0" and the subsequent (third) bit value is a "1".

A fifth comparator 138 has an input on line 104 to accept the NRZ data stream, an input on line 106e establishing a fifth threshold (a00), and an output on line 108e to supply a first bit estimate when the second and third bit values are equal to "0". The output of the fifth comparator 138 becomes critical in determining the first bit value in circumstances where the preceding (second) bit value is a "0" and the subsequent (third) bit value is a "0".

Returning to FIG. 3, in some aspects of the system 100, the multi-threshold circuit 102 accepts an NRZ data stream encoded with forward error correction (FEC), and the system 100 further comprises a forward error correction (FEC) circuit 140. The FEC circuit 140 has an input on line 112 to receive the first bit value from the non-causal circuit. The FEC circuit 140 decodes the incoming data stream (on line 112) and corrects bit values in response to the decoding. The FEC circuit 140 has an output on line 106 to supply threshold values to the multi-threshold circuit 102 in response to the FEC corrections and an output on line 142 to supply a stream of corrected data bits.

Figure 5:
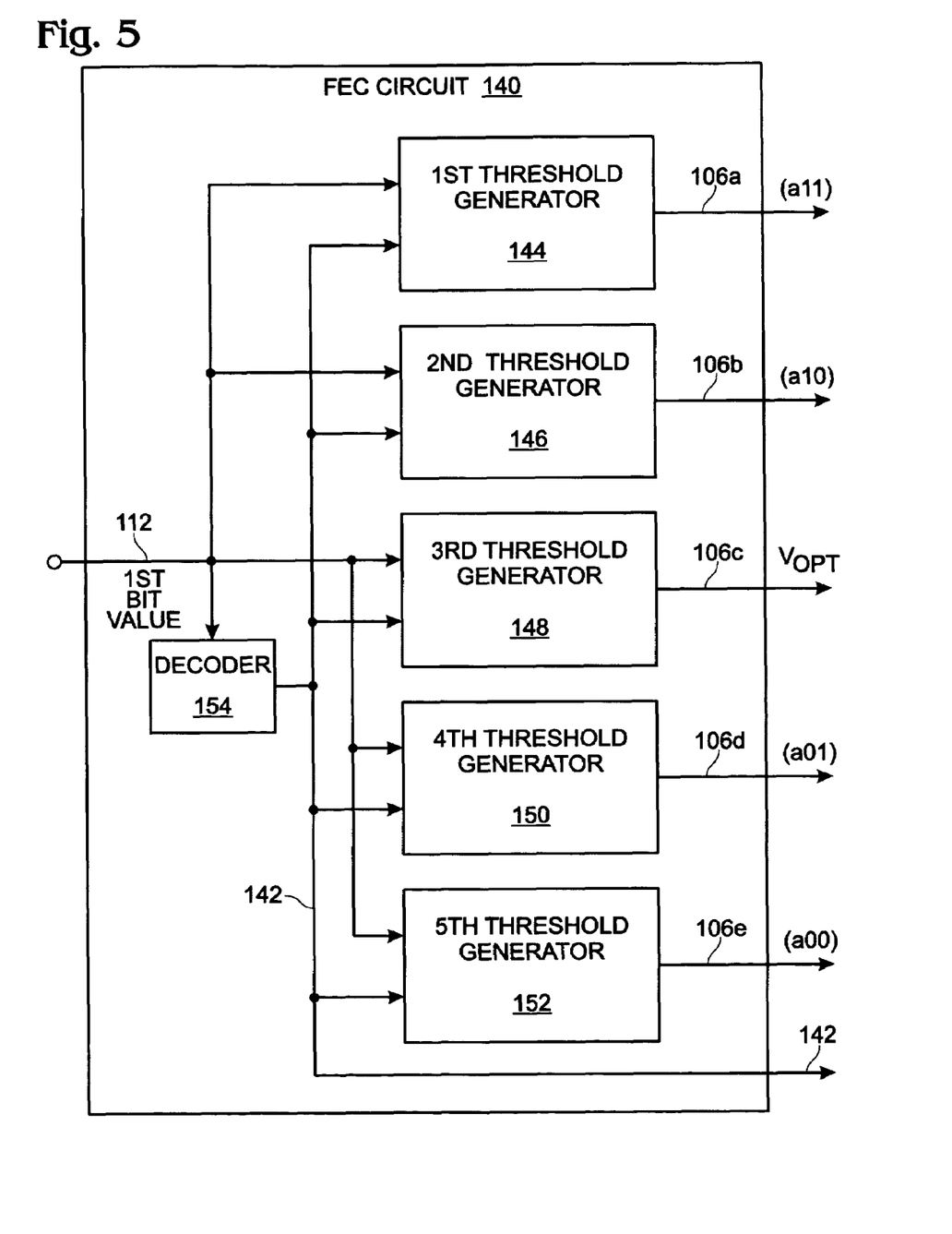
FIG. 5 is a schematic block diagram detailing additional aspects of the FEC circuit of FIG. 3.

FIG. 5 is a schematic block diagram detailing additional aspects of the FEC circuit 140 of FIG. 3. The FEC circuit 140 includes a first threshold generator 144 having an inputs on lines 112 and 142 to respectively accept the first bit values from the non-causal circuit 110 and the stream of corrected data bits. The first threshold generator 144 tracks the number of corrections in the first bit when the first bit is determined to be a "0" value and the second and third bits are both "1" values. Likewise, the first threshold generator 144 tracks the number of corrections in the first bit when the first bit is determined to be a "1" value and the second and third bits are both "1" values. The first threshold generator 144 has an output has an output on line 106a to supply the first threshold (a11) in response to the tracked corrections.

The FEC circuit 140 includes a second threshold generator 146 having an input on line 112 to accept the first bit values from the non-causal circuit 110 and an input to accept the stream of corrected data bits on line 142. The second threshold generator 146 tracks the number of corrections in the first bit when the first bit is determined to be a "0" value, the second bit value is a "1", and the third bits is a "0" value. Likewise, the second threshold generator 146 tracks the number of corrections in the first bit when the first bit is determined to be a "1" value, the second bit value is a "1", and the third bits is a "0" value. The second threshold generator 146 has an output on line 106b to supply the second threshold (a10) in response to the tracked corrections.

The FEC circuit 140 includes a third threshold generator 148 having an input on line 112 to accept the first bit values from the non-causal circuit 110 and an input to accept the stream of corrected data bits on line 142. The third threshold generator tracks the number of corrections in the first bit when the first bit is determined to be a "0" value. Likewise, the third threshold generator 148 tracks the number of corrections in the first bit when the first bit is determined to be a "1" value. The third threshold generator 148 has an output on line 106c to supply the third threshold (Vopt) in response tracking the total number of "0" bit value and "1" bit value errors.

The FEC circuit 140 includes a fourth threshold generator 150 having an input on line 112 to accept the first bit values from the non-causal circuit 110 and an input to accept the stream of corrected data bits on line 142. The fourth threshold generator 150 tracks the number of corrections in the first bit when the first bit is determined to be a "0" value, the second bit value is a "0", and the third bit is a "1" value. Likewise, the fourth threshold generator 150 tracks the number of corrections in the first bit when the first bit is determined to be a "1" value, the second bit value is a "0", and the third bits is a "1" value. The fourth threshold generator 150 has an output on line 106d to supply the fourth threshold (a01) in response to the tracked corrections.

The FEC circuit 140 includes a fifth threshold generator 152 having an input on line 112 to accept the first bit values from the non-causal circuit 110 and an input to accept the stream of corrected data bits on line 142. The fifth threshold generator 152 tracks the number of corrections in the first bit when the first bit is determined to be a "0" value and the second and third bits are both "0" values. Likewise, the fifth threshold generator 152 tracks the number of corrections in the first bit when the first bit is determined to be a "1" value and the second and third bits are both "0" values. The fifth threshold generator 152 has an output on line 106e to supply the fifth threshold (a00) in response to the tracked corrections. As shown, a decoder 154 is used to generate the stream of corrected data bits on line 142 from the first bit values on line 112.

Returning to FIG. 3, alternate aspects of the system 100 use an averaging circuit 160 to generate the threshold values.

Figure 6:
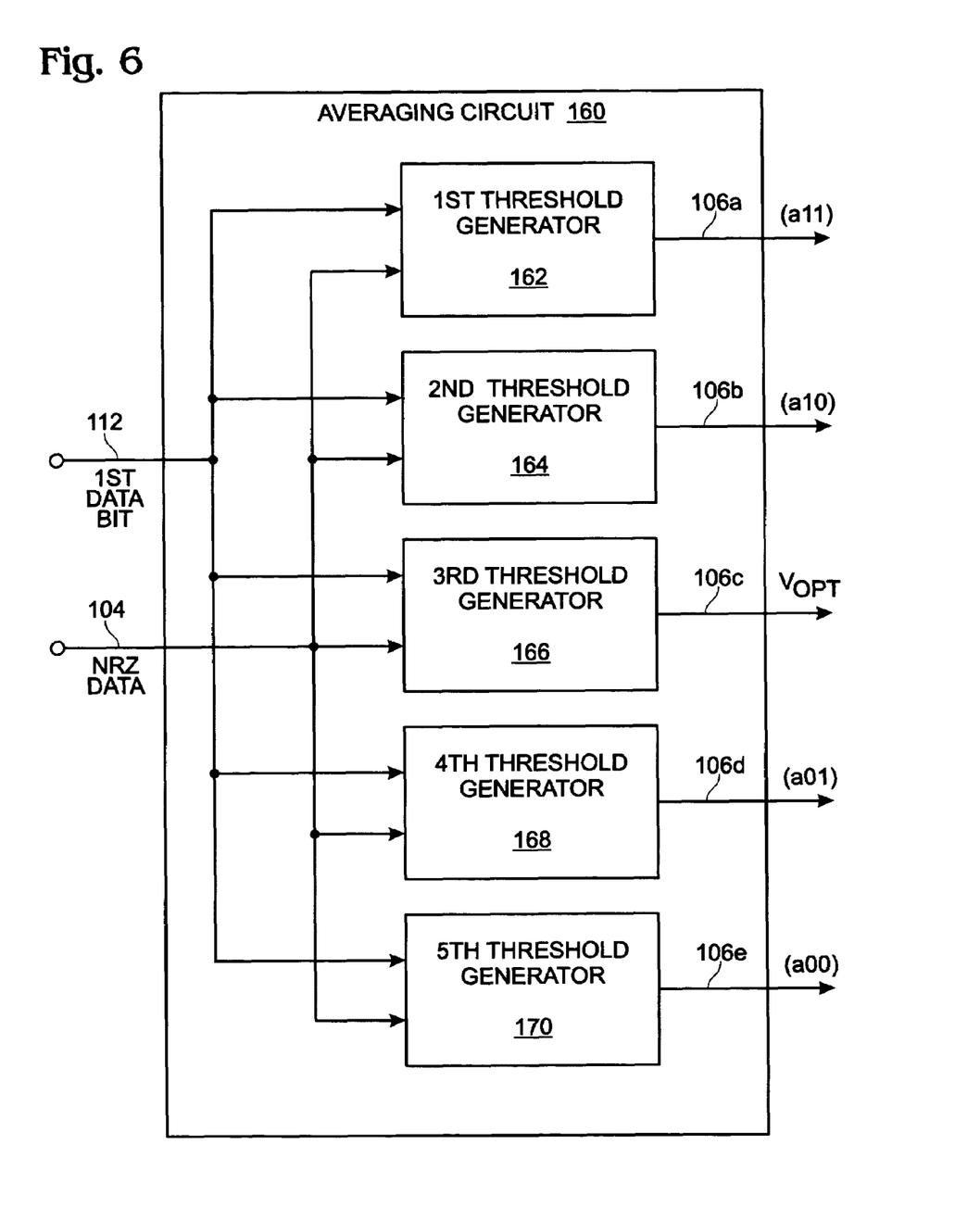
FIG. 6 is a schematic block diagram illustrating in greater detail the averaging circuit of FIG. 3.

FIG. 6 is a schematic block diagram illustrating in greater detail the averaging circuit 160 of FIG. 3. A first threshold generator 162 has an input on line 112 connected to the output of the non-causal circuit 110 and an input on line 104 to accept the NRZ data stream. The first threshold generator 162 tracks the NRZ data stream inputs when the second and third bit values both equal "1" and maintains a long-term average of the tracked NRZ data stream inputs. That is, the first threshold generator maintains a long-term average of the first bit input voltage level when the second and third bit values are both a "1". The first threshold generator 162 has an output on line 106a to supply the first threshold (a11) responsive to the long-term average.

A second threshold generator 164 has an input on line 112 connected to the output of the non-causal circuit 110 and an input to accept the NRZ data stream input on line 104. The second threshold generator 164 tracks the NRZ data stream inputs when the second bit value is a "1" and the third bit value is a "0" and maintains a long-term average of the NRZ data stream inputs. That is, the second threshold generator 164 maintains a long-term average of the first bit input voltage level when the second bit value is a "1" and the third bit value is a "0". The second threshold generator 164 has an output on line 106b to supply the second threshold (a10) responsive to the long-term average.

A third threshold generator 166 has an input on line 112 connected to the output of the non-causal circuit 110 and an input on line 104 to accept the NRZ data stream input. The third threshold generator 166 tracks the NRZ data stream inputs to maintain an overall long-term average of the NRZ data stream inputs. That is, an assumption is made that the first bit value has an equal chance of being either a "1" or a "0" bit and the second threshold generator 164 maintains a long-term average of overall input voltage level. The third threshold generator 166 has an output on line 106c to supply the third threshold (Vopt) responsive to the overall long-term average.

A fourth threshold generator 168 has an input on line 112 connected to the output of the non-causal circuit 110 and an input on line 104 to accept the NRZ data stream input. The fourth threshold generator 168 tracks the NRZ data stream inputs when the second bit value is a "0" and the third bit value is a "1" and maintains a long-term average of the NRZ data stream inputs. That is, the fourth threshold generator 168 maintains a long-term average of the first bit input voltage level when the second bit value is a "0" and the third bit value is a "1". The fourth threshold generator 168 has an output on line 106d to supply the fourth threshold (a01) responsive to the long-term average.

A fifth threshold generator 170 has an input on line 112 connected to the output of the non-causal circuit 110 and an input on line 104 to accept the NRZ data stream input. The fifth threshold generator 170 tracks the NRZ data stream inputs when the second and third bit values both equal "0" and maintains a long-term average of the NRZ data stream inputs. That is, the fifth threshold generator 170 maintains a long-term average of the first bit input voltage level when the second bit value is a "0" and the third bit value is a "0". The fifth threshold generator 170 has an output on line 106e to supply the fifth threshold (a00) responsive to the long-term average.

In another variation of the system 100, the third threshold generator 166 has inputs (not shown) connected to the second and fourth threshold generator outputs on lines 106b and 106d, respectively. The third threshold generator 166 supplies the third threshold (Vopt) on line 106c that is approximately midway between the second and fourth thresholds.

In other aspects of the system 100, the FEC circuit 140 (see FIG. 5) is used with the averaging circuit 160. The FEC circuit 140 decodes the incoming data stream on line 112, corrects bit values in response to the decoding, and determines the total number of "0" bit and "1" bit value errors. The FEC circuit 140 has an output (not shown) from the decoder 154 connected to the averaging circuit 160 to supply threshold adjustments in response to the determined balance of "1" and "0" bit value errors. In one aspect, the FEC circuit adjusts the third threshold output (Vopt), and the same adjustment is made to the other thresholds. In another aspect, the FEC circuit adjusts each threshold generator independently in response to their corresponding bit patterns. For example, the FEC may correct the first threshold generator 162 directly in response to analysis of the bit pattern 1:?:1, which corresponds to the all threshold.

Figure 7:
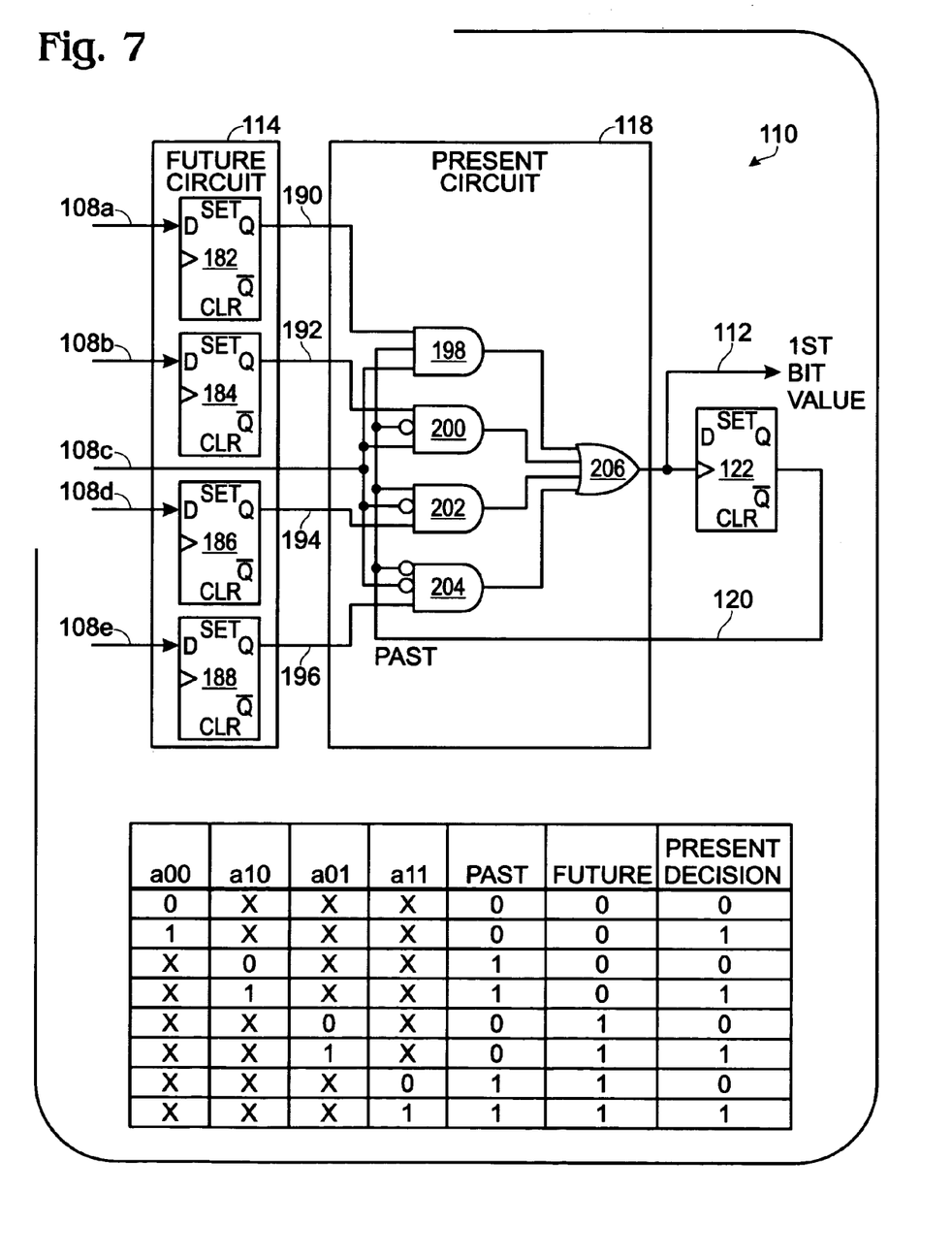
FIG. 7 is a detailed depiction of the non-causal circuit 110 of FIG. 3 and a truth table illustrating the operation of the non-causal circuit.

FIG. 7 is a detailed depiction of the non-causal circuit 110 of FIG. 3 and a truth table illustrating the operation of the non-causal circuit 110. The future circuit 114 accepts the five outputs of the multi-threshold circuit on lines 108a through 108e. Lines 108a, 108b, 108d, and 108e are delayed a clock cycle, while 108c, the signal associated with the Vopt threshold is passed through as the third (future) bit value. Flip-flops 182, 184, 186, and 188 are shown, but the first bit estimate delayed signals on lines 190, 192, 194, and 196 can be achieved by many other conventional means known to those in the art.

The first bit estimates on lines 190, 192, 194, and 196, as well as the third bit value on line 108c, are received by the present circuit 118, along with the second (past) bit value on line 120. The signals are manipulated to achieve the results shown in the table. AND gates 198, 200, 202, and 204 are shown, along with OR gate 206, to enable the truth table. However, there are many other equivalent circuits that could be designed to accomplish the same result. The past circuit 122 is shown enabled with a flip-flop. However, other circuits could be used to achieve the required one clock cycle delay between the first bit value on line 112 and the second bit value on line 120.

The first two lines of the truth table are used for situations when the second (past) and third (future) bits are both a "0". The first line indicates that when a00(the fifth threshold) is "0" (that is, the NRZ data input is less than the a00 threshold), the first (present) bit value is determined to be "0". When the fifth threshold detects a "1" (the NRZ data input exceeds the all threshold), the first bit value is determined to be a "1".

The third and fourth lines of the truth table are used for situations when the second (past) bit value is a "1" and third (future) bit value is a "0". The third line indicates that when a10 is "0" (the second threshold), the first (present) bit value is determined to be "0". When the second threshold detects a "1", the first bit value is determined to be a "1".

The fifth and sixth lines of the truth table are used for situations when the second (past) bit value is a "0" and third (future) bit value is a "1". The fifth line indicates that when a01 (the fourth threshold) is a "0", the first (present) bit value is determined to be "0". When the fourth threshold detects a "1", the first bit value is determined to be a "1".

The seventh and eighth lines of the truth table are used for situations when the second (past) bit value is a "1" and third (future) bit value is a "1". The seventh line indicates that when a11 is "0" (the first threshold), the first (present) bit value is determined to be "0". When the first threshold detects a "1", the first bit value is determined to be a "1".

Figure 8A:
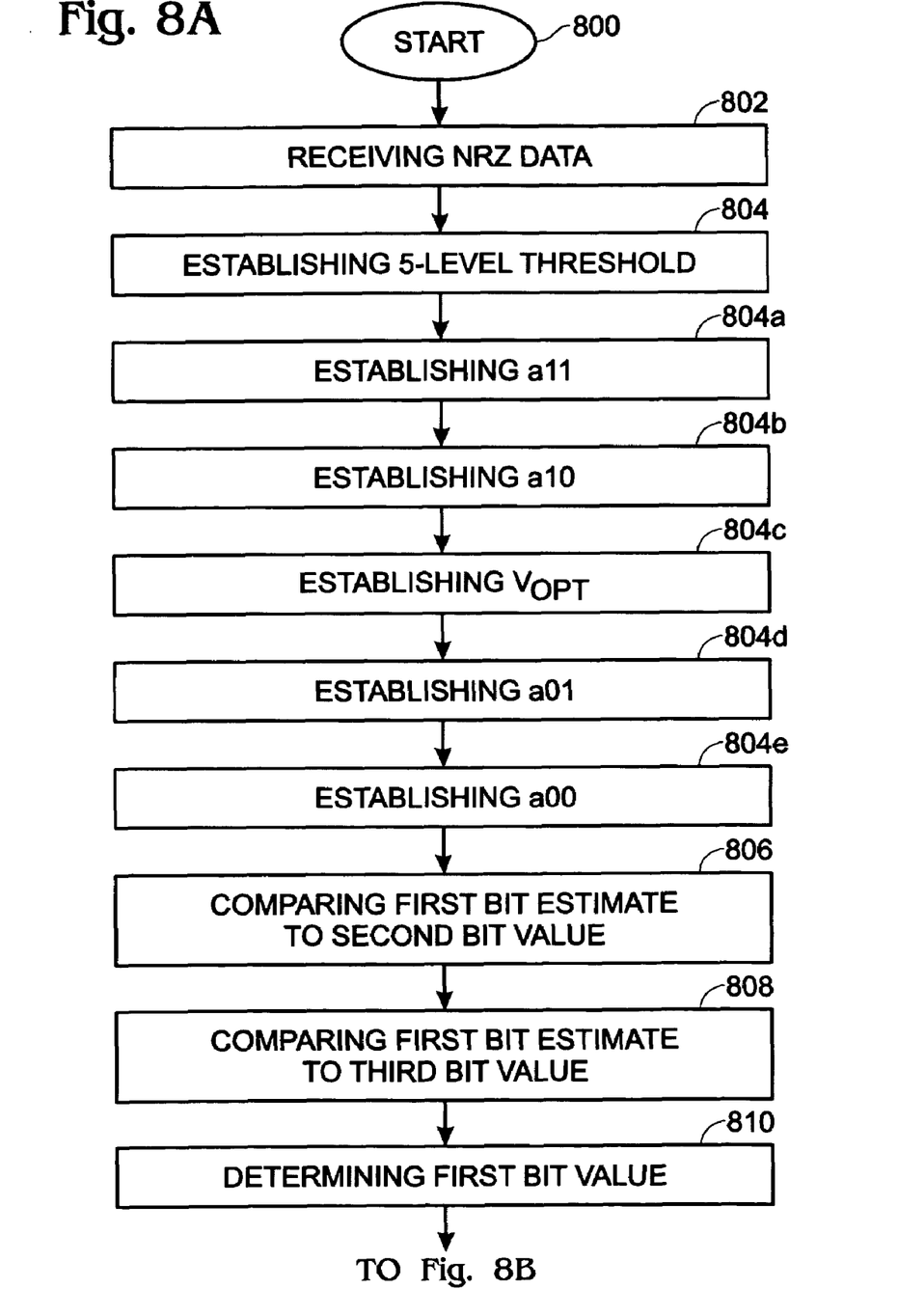
FIGS. 8a and 8b are flowcharts illustrating the present invention method for five-level non-causal channel equalization in a communications system.
Figure 8B:
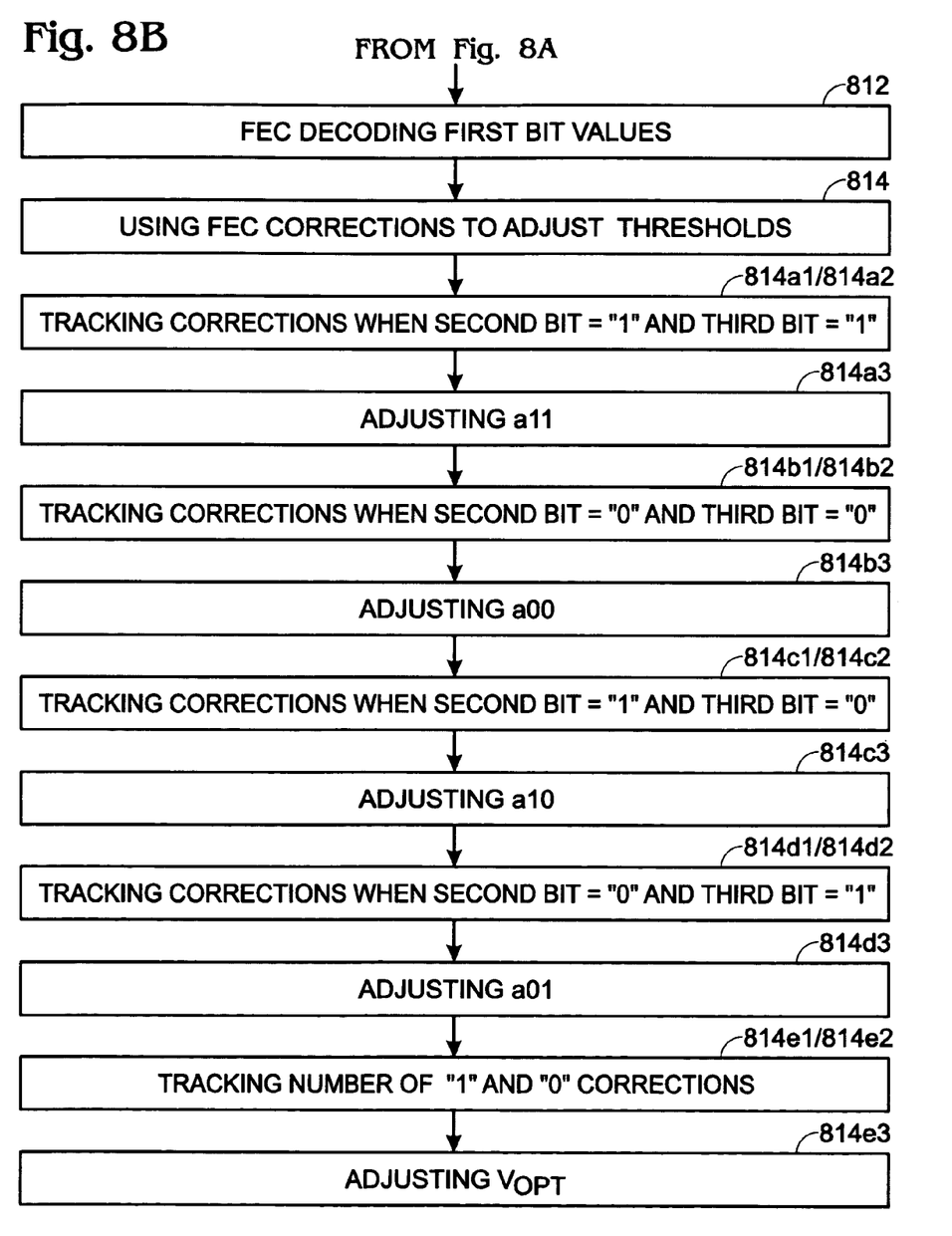

FIGS. 8a and 8b are flowcharts illustrating the present invention method for five-level non-causal channel equalization in a communications system. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 800. Step 802 receives a non-return to zero (NRZ) data stream input. Step 804 establishes a five-level threshold to distinguish a first bit estimate. Step 806 compares the first bit estimate in the data stream to a second bit value received prior to the first bit. Step 808 compares the first bit estimate to a third bit value received subsequent to the first bit. Step 810, in response to the comparisons, determines the value of the first bit.

In some aspects of the method, establishing a five-level threshold to distinguish a first bit estimate in Step 804 includes substeps. Step 804a establishes a first threshold (a11) to distinguish a first bit value when the second and third bit values are a "1" value. Step 804b establishes a second threshold (a10) to distinguish a first bit estimate when the second bit value is a "1" and the third bit value is a "0". Step 804c establishes a third threshold (Vopt) to distinguish first bit estimates having an approximately equal probability of being a "1" value as a "0" value. Step 804d establishes a fourth threshold (a01) to distinguish a first bit estimate when the second bit value is a "0" and the third bit value is a "1". Step 804e establishes a fifth threshold (a00) to distinguish a first bit estimate when the second and third bit values are a "0" value. Step 805 (not shown) supplies the first bit estimate for comparison in response to distinguishing the NRZ data stream input at the first, second, third, fourth, and fifth thresholds.

In some aspects, receiving a non-return to zero data stream in Step 802 includes receiving a non-return to zero data stream encoded with forward error correction (FEC). Then, the method comprises further steps. Step 812, following the determination of the first bit values, FEC decodes the first bit values. Step 814 uses the FEC corrections of the first bit values to adjust the first, second, third, fourth, and fifth threshold values.

Using the FEC corrections of the first bit values to adjust the first, second, third, fourth, and fifth threshold values in Step 814 includes substeps. Step 814a1 tracks the number of corrections in the first bit when the first bit is determined to be a "0" value and the second and third bits are both "1" values.

Step 814a2 tracks the number of corrections in the first bit when the first bit is determined to be a "1" value and the second and third bits are both "1" values. Step 814a3 adjusts the first threshold (a11) in response to the tracked corrections.

Step 814b1 tracks the number of corrections in the first bit when the first bit is determined to be a "0" value and the second and third bits are both "0" values. Step 814b2 tracks the number of corrections in the first bit when the first bit is determined to be a "1" value and the second and third bits are both "0" values. Step 814b3 adjusts the fifth threshold (a00) in response to the tracked corrections.

Step 814c1 tracks the number of corrections in the first bit when the first bit is determined to be a "0" value, the second bit value is a "1", and third bit value is a "0". Step 814c2 tracks the number of corrections in the first bit when the first bit is determined to be a "1" value, the second bit value is a "1", and third bit value is a "0". Step 814c3 adjusts the second threshold (a10) in response to the tracked corrections.

Step 814d1 tracks the number of corrections in the first bit when the first bit is determined to be a "0" value, the second bit value is a "0", and third bit value is a "1". Step 814d2 tracks the number of corrections in the first bit when the first bit is determined to be a "1" value, the second bit value is a "0", and third bit value is a "1". Step 814d3 adjusts the fourth threshold (a01) in response to the tracked corrections.

Step 814e1 tracks the number of corrections in the first bit when the first bit is determined to be a "0" value. Step 814e2 tracks the number of corrections in the first bit when the first bit is determined to be a "1" value. Step 814e3 adjusts the third threshold (Vopt) in response to the tracked corrections. Note, balancing the number of "1" and "0" errors is just one of many similar ways that can be used to find the optimal Vopt threshold.

Figure 9A:
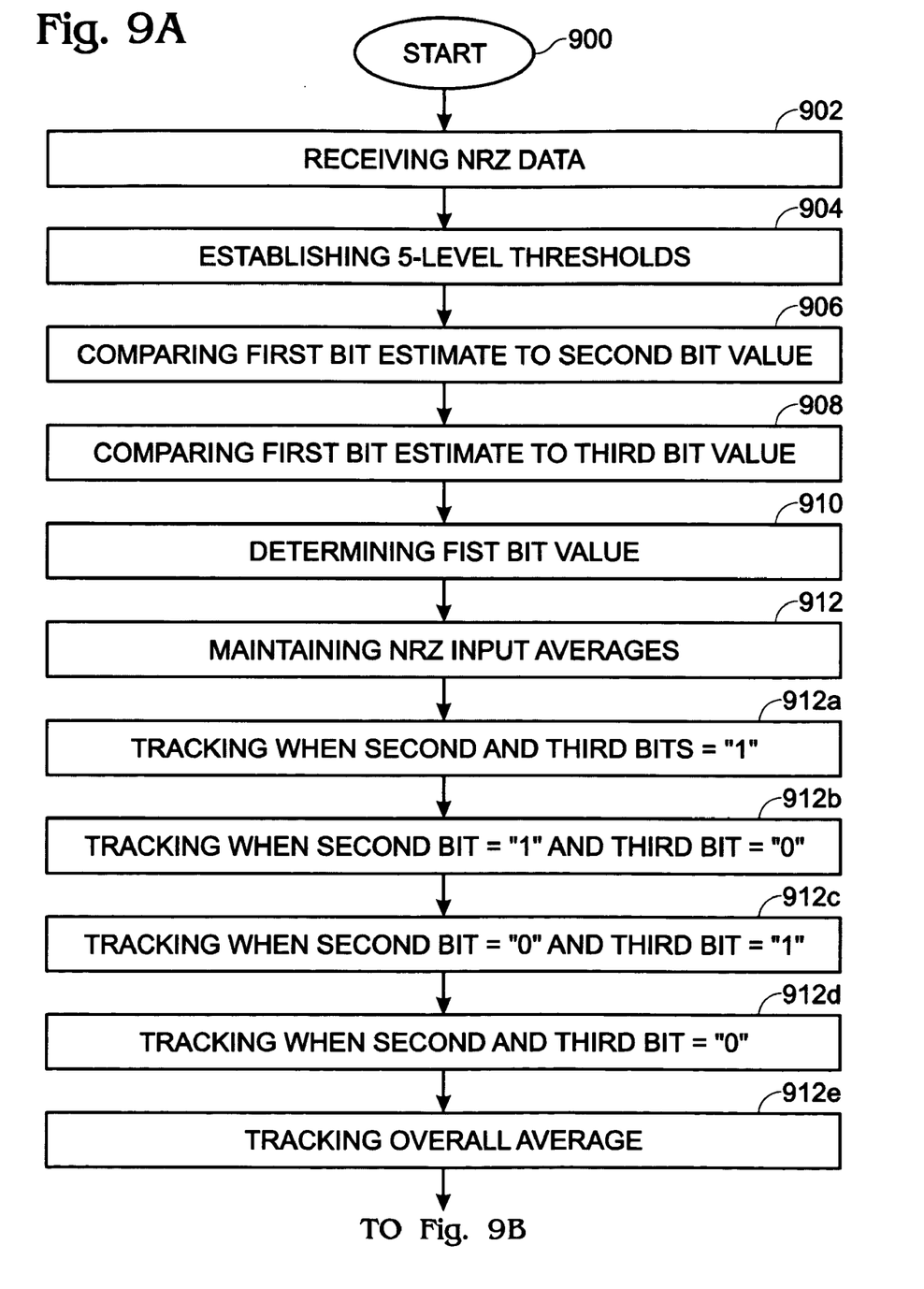
FIGS. 9a and 9b are flowcharts illustrating a variation on the method depicted in FIGS. 8a and 8b.
Figure 9B:
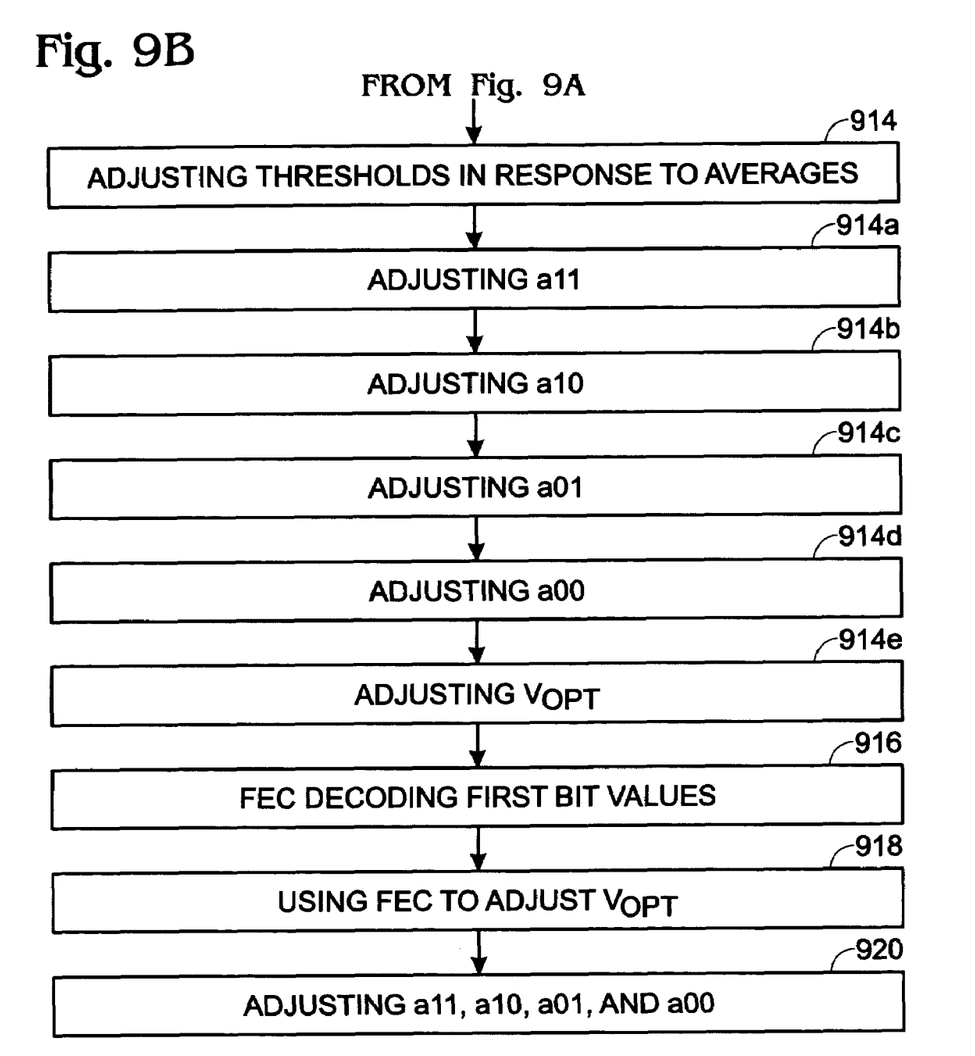

FIGS. 9a and 9b are flowcharts illustrating a variation on the method depicted in FIGS. 8a and 8b. Step 800 through 810 in FIG. 8 correspond respectively to Steps 900 through 910, and will not be repeated in the interest of brevity. Step 912 maintains long-term averages of the NRZ data stream inputs. Step 914 adjusts the first, second, third, fourth, and fifth thresholds in response to the long-term averages.

In some aspects of the method, maintaining long-term averages of the NRZ data stream inputs in Step 912a includes tracking the NRZ data stream inputs when both the second and third bit values equal "1". Adjusting the first, second, third, fourth, and fifth thresholds in response to the long-term averages in Step 914a includes adjusting the first threshold (a11) in response to the long-term average of when the second and third bit values both equal "1".

Maintaining long-term averages of the NRZ data stream inputs in Step 912b includes tracking the NRZ data stream inputs when the second bit value is a "1" and third bit value is a "0". Adjusting the first, second, third, fourth, and fifth thresholds in response to the long-term averages in Step 914b includes adjusting the second threshold (a10) in response to the long-term average of when the second bit value is a "1" and third bit value is a "0".

Maintaining long-term averages of the NRZ data stream inputs in Step 912c includes tracking the NRZ data stream inputs when the second bit value is a "0" and third bit value is a "1". Adjusting the first, second, third, fourth, and fifth thresholds in response to the long-term averages in Step 914c includes adjusting the fourth threshold (a01) in response to the long-term average of when the second bit value is a "0" and third bit value is a "1".

Maintaining long-term averages of the NRZ data stream inputs in Step 912d includes tracking the NRZ data stream inputs when both the second and third bit values are a "0". Adjusting the first, second, third, fourth, and fifth thresholds in response to the long-term averages in Step 914d includes adjusting the fifth threshold (a00) in response to the long-term average of when the second and third bit values are a "0".

Maintaining long-term averages of the NRZ data stream inputs in Step 912e includes tracking the NRZ data stream input overall average. Then, adjusting the first, second, third, fourth, and fifth thresholds in response to the long-term averages in Step 914e includes adjusting the third threshold in response to the overall average.

In one aspect, adjusting the first, second, third, fourth, and fifth thresholds in response to the long-term averages in Step 914e includes adjusting the third threshold (Vopt) to be approximately midway between the second and fourth thresholds.

Alternately, receiving a non-return to zero data stream in Step 902 includes receiving a non-return to zero data stream encoded with forward error correction. The method comprises further steps. Step 916, following the determination of the first bit values, FEC decodes the first bit values to determine the total number of "1" bit value errors and "0" bit value errors. Then, Step 918 uses the FEC corrections of the first bit values to make an adjustment to the third threshold (Vopt). In other aspects, Step 920 applies the adjustment made to the third threshold, to the first, second, fourth, and fifth thresholds.

Figure 10:
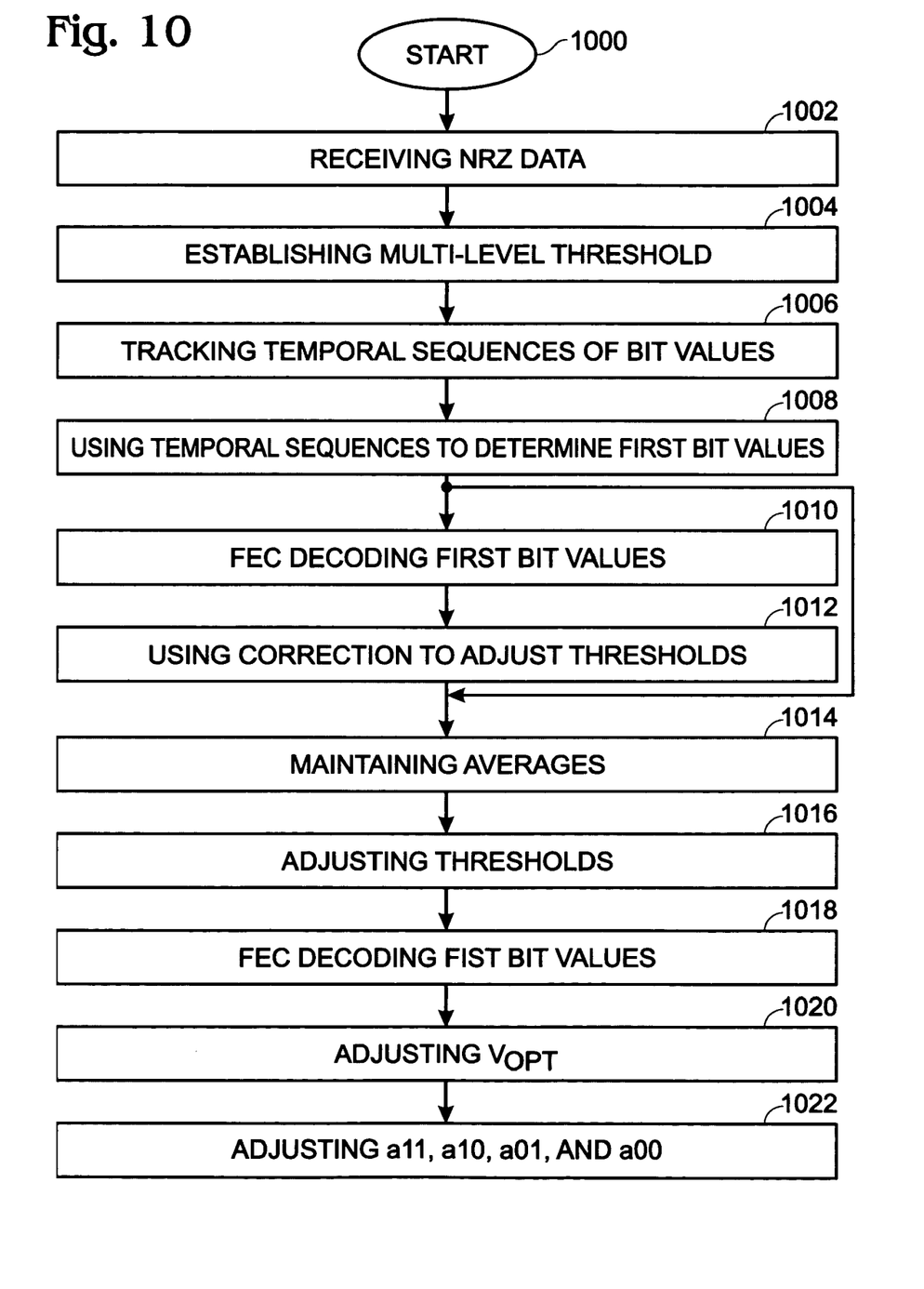
FIG. 10 is a flowchart illustrating another variation of the present invention method for non-causal channel equalization.

FIG. 10 is a flowchart illustrating another variation of the present invention method for non-causal channel equalization. The method starts at Step 1000. Step 1002 receives non-return to zero (NRZ) data. Step 1004 establishes a multi-level threshold to distinguish bit estimates. In one aspect, a five-level threshold is established. Step 1006 tracks temporal sequences of bit values. Step 1008 uses the temporal sequences to determine the first bit values.

Using the temporal sequences to determine the first bit values in Step 1008 includes substeps (not shown). Step 1008a uses a first threshold (a11) to distinguish a first bit value when the second and third bit values are a "1" value. Step 1008b uses a second threshold (a10) to distinguish a first bit estimate when the second bit value is a "1" and the third bit value is a "0". Step 1008c uses a third threshold (Vopt) to distinguish first bit estimates having an approximately equal probability of being a "1" value as a "0" value. Technically, the output of the Vopt thresholding is not related to any particular temporal sequence, but is used to establish the third (future) bit value. Therefore, this step can be more properly considered an aspect of Step 1006. However, as presented below, some adjustments that are applied to Vopt, are also applied to the other thresholds. Step 1008d uses a fourth threshold (a01) to distinguish a first bit estimate when the second bit value is a "0" and the third bit value is a "1". Step 1008e uses a fifth threshold (a00) to distinguish a first bit estimate when the second and third bit values are a "0" value.

When Step 1002 includes receiving a non-return to zero data stream encoded with forward error correction (FEC). Then, Step 1010, following the determination of the first bit values, FEC decodes the first bit values. Step 1012 uses the FEC corrections of the first bit values to adjust the first, second, third, fourth, and fifth threshold values. The substeps involved in adjusting the thresholds by this process are equivalent to the description of Steps 814 above, and will not be repeated in the interest of brevity.

Alternately, Step 1014 maintains long-term averages of the NRZ data stream inputs, and Step 1016 adjusts the first, second, third, fourth, and fifth thresholds in response to the long-term averages. The substeps involved in adjusting the thresholds by this process are equivalent to the description of Steps 912 and 914 above, and will not be repeated in the interest of brevity. In other aspects, Step 1018, following the determination of the first bit values, FEC decodes the first bit values to determine the total number of "1" bit value errors and "0" bit value errors, and Step 1020 uses the FEC corrections of the first bit values to make an adjustment to the third threshold (Vopt). In other aspects, Step 1022 applies the adjustment, made to the third threshold, to the first, second, fourth, and fifth thresholds.

A system and method have been provided for non-causally adjusting a NRZ data stream channel using a five-level threshold. Because inter-symbol dispersion is a non-causal impairment, the estimation algorithms are more effective when based upon iteratively collected data. The degree of iteration affects the performance of the circuit and is selected based upon the implementation tradeoffs. It is expected that those skilled in the art could implement the collection of such data. Although exemplary analysis algorithms using only the preceding and subsequent bits have been explicitly described, the present invention would obviously apply to algorithms using one than one preceding or subsequent bit value. Other embodiments and variations of the invention will occur to those skilled in the art.

We claim:

1. A five-level non-causal channel equalization communication system, the system comprising:
  a multi-threshold decision circuit having an input to accept a non-return to zero (NRZ) data stream, an input to accept threshold values, and outputs to provide bit estimates responsive to five voltage threshold levels; and,
  a non-causal circuit having inputs to accept bit estimates from the multi-threshold decision circuit, the non-causal circuit comparing a current bit estimate to bit value decisions made across a plurality of clock cycles, the non-causal circuit having an output to supply a bit value for the current bit estimate determined in response to the non-causal bit value comparisons.

2. The system of claim 1 wherein the non-causal circuit includes:
  a future decision circuit having inputs connected to the mutli-threshold circuit outputs, the future decision circuit having outputs to supply the current, first bit, estimate and a third bit value;
  a present decision circuit having inputs to accept the first bit estimate, the third bit value, and a second bit value, the present decision circuit comparing the first bit estimate to both the second bit value, received prior to the first bit estimate, and the third bit value, received subsequent to the first bit estimate, the present decision circuit having an output to supply the first bit value determined in response to comparing the first bit estimates to the second and third bit values; and,
  a past decision circuit having an input to accept the first bit value and an output to supply the second bit value.

3. The system of claim 2 wherein the multi-threshold circuit includes:
  a first comparator having an input to accept the NRZ data stream, an input establishing a first threshold (a11), and an output to supply a first bit estimate when the second and third bit values are equal to "1";
  a second comparator having an input to accept the NRZ data stream, an input establishing a second threshold (a10), and an output to supply a first bit estimate when the second bit value is a "1" and the third bit value is a "0";
  a third comparator having an input to accept the NRZ data stream, an input establishing a third threshold (Vopt), and an output to supply a signal having an approximately equal probability of being a "0" value as a "1" value;
  a fourth comparator having an input to accept the NRZ data stream, an input establishing a fourth threshold (a01), and an output to supply a first bit estimate when the second bit value is a "0" and the third bit value is a "1"; and,
  a fifth comparator having an input to accept the NRZ data stream, an input establishing a fifth threshold (a00), and an output to supply a first bit estimate when the second and third bit values are equal to "0".

4. The system of claim 3 wherein the multi-threshold circuit accepts an NRZ data stream encoded with forward error correction (FEC); and,
  the system further comprising:
    a forward error correction (FEC) circuit having an input to receive the first bit value from the non-causal circuit, the FEC circuit decoding the incoming data stream and correcting bit values in response to the decoding, the FEC circuit having an output to supply threshold values to the multi-threshold circuit in response to the FEC corrections and an output to supply a stream of corrected data bits.

5. The system of claim 4 wherein the FEC circuit includes a first threshold generator having an inputs to accept the first bit values from the non-causal circuit and the stream of corrected data bits, the first threshold generator:
  tracking the number of corrections in the first bit when the first bit is determined to be a "0" value and the second and third bits are both "1" values;
  tracking the number of corrections in the first bit when the first bit is determined to be a "1" value and the second and third bits are both "1" values; and,
  wherein the first threshold generator has an output to supply the first threshold (a11) in response to the tracked corrections.

6. The system of claim 5 wherein the FEC circuit includes a fifth threshold generator having inputs to accept the first bit values from the non-causal circuit and the stream of corrected data bits, the fifth threshold generator:
  tracking the number of corrections in the first bit when the first bit is determined to be a "0" value and the second and third bits are both "0" values;
  tracking the number of corrections in the first bit when the first bit is determined to be a "1" value and the second and third bits are both "0" values; and,
  wherein the fifth threshold generator has an output to supply the fifth threshold (a00) in response to the tracked corrections.

7. The system of claim 6 wherein the FEC circuit includes a second threshold generator having inputs to accept the first bit values from the non-causal circuit and the stream of corrected data bits, the second threshold generator:
  tracking the number of corrections in the first bit when the first bit is determined to be a "0" value, the second bit value is a "1", and the third bits is a "0" value;
  tracking the number of corrections in the first bit when the first bit is determined to be a "1" value, the second bit value is a "1", and the third bits is a "0" value; and,
  wherein the second threshold generator has an output to supply the second threshold (a10) in response to the tracked corrections.

8. The system of claim 7 wherein the FEC circuit includes a fourth threshold generator having inputs to accept the first bit values from the non-causal circuit and the stream of corrected data bits, the fourth threshold generator:

tracking the number of corrections in the first bit when the first bit is determined to be a "0" value, the second bit value is a "0", and the third bits is a "1" value;

tracking the number of corrections in the first bit when the first bit is determined to be a "1" value, the second bit value is a "0", and the third bits is a "1" value; and, wherein the fourth threshold generator has an output to supply the fourth threshold (a01) in response to the tracked corrections.

9. The system of claim 8 wherein the FEC circuit includes a third threshold generator having inputs to accept the first bit values from the non-causal circuit and the stream of corrected data bits, the third threshold generator:

tracking the number of corrections in the first bit when the first bit is determined to be a "0" value;

tracking the number of corrections in the first bit when the first bit is determined to be a "1" value; and, wherein the third threshold generator has an output to supply the third threshold (Vopt) in response tracking the total number of "0" bit value and "1" bit value errors.

10. The system of claim 3 further comprising an averaging circuit, the averaging circuit including:

a first threshold generator having an input connected to the output of the non-causal circuit and an input to accept the NRZ data stream, the first threshold generator tracking the NRZ data stream inputs when the second and third bit values both equal "1" and maintaining a long-term average of the tracked NRZ data stream inputs, the first threshold generator having an output to supply the first threshold (a11) responsive to the long-term average.

11. The system of claim 10 wherein the averaging circuit further includes:

a fifth threshold generator having an input connected to the output of the non-causal circuit and an input to accept the NRZ data stream input, the fifth threshold generator tracking the NRZ data stream inputs when the second and third bit values both equal "0" and maintaining a long-term average of the NRZ data stream inputs, the fifth threshold generator having an output to supply the fifth threshold (a00) responsive to the long-term average.

12. The system of claim 11 wherein the averaging circuit further includes:

a second threshold generator having an input connected to the output of the non-causal circuit and an input to accept the NRZ data stream input, the second threshold generator tracking the NRZ data stream inputs when the second bit value is a "1" and the third bit value is a "0" and maintaining a long-term average of the NRZ data stream inputs, the second threshold generator having an output to supply the second threshold (a10) responsive to the long-term average.

13. The system of claim 12 wherein the averaging circuit further includes:

a fourth threshold generator having an input connected to the output of the non-causal circuit and an input to accept the NRZ data stream input, the fourth threshold generator tracking the NRZ data stream inputs when the second bit value is a "0" and the third bit value is a "1" and maintaining a long-term average of the NRZ data stream inputs, the fourth threshold generator having an output to supply the fourth threshold (a01) responsive to the long-term average.

14. The system of claim 13 wherein the averaging circuit further includes:

a third threshold generator having an input connected to the output of the non-causal circuit and an input to accept the NRZ data stream input, the third threshold generator tracking the NRZ data stream inputs to maintain an overall long-term average of the NRZ data stream inputs, the third threshold generator having an output to supply the third threshold (Vopt) responsive to the overall long-term average.

15. The system of claim 14 wherein the multi-threshold circuit accepts an NRZ data stream encoded with forward error correction (FEC); and, the system further comprising:

a forward error correction (FEC) circuit having an input to receive the first bit value from the non-causal circuit, the FEC circuit decoding the incoming data stream, correcting bit values in response to the decoding, and determining "0" bit and "1" bit value errors, the FEC circuit having an output connected to the averaging circuit to supply threshold adjustments in response to the determined "1" and "0" bit value errors.

16. The system of claim 13 further comprising:

a third threshold generator having an input connected to the outputs of the second and fourth threshold generators, the third threshold generator having an output to supply the third threshold (Vopt) approximately midway between the second and fourth thresholds.

* * * * *